(12) United States Patent
Harrison

(10) Patent No.: US 9,871,459 B2
(45) Date of Patent: Jan. 16, 2018

(54) METHOD AND APPARATUS FOR DERIVING CURRENT FOR CONTROL IN A RESONANT POWER CONVERTER

(71) Applicant: Enphase Energy, Inc., Petaluma, CA (US)

(72) Inventor: Michael Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 382 days.

(21) Appl. No.: 14/278,372

(22) Filed: May 15, 2014

(65) Prior Publication Data
US 2014/0354303 A1 Dec. 4, 2014

Related U.S. Application Data

(60) Provisional application No. 61/828,761, filed on May 30, 2013.

(51) Int. Cl.
*H02M 3/337* (2006.01)
*H02S 50/00* (2014.01)
*H02M 1/00* (2006.01)

(52) U.S. Cl.
CPC .......... *H02M 3/3376* (2013.01); *H02S 50/00* (2013.01); *H02M 2001/0009* (2013.01); *H02M 2001/0058* (2013.01); *Y02B 70/1433* (2013.01); *Y02B 70/1491* (2013.01)

(58) Field of Classification Search
CPC ................ G01R 19/00; H02M 3/3376; H02M 2001/0058; H02M 2001/0009; H02S 50/00
See application file for complete search history.

(56) References Cited

U.S. PATENT DOCUMENTS

| 4,649,548 | A | * | 3/1987 | Crane | ............... H04L 12/40032 330/189 |
|---|---|---|---|---|---|
| 5,438,498 | A | * | 8/1995 | Ingemi | ............... H02M 3/3376 363/132 |
| 5,783,799 | A | | 7/1998 | Geissler | |
| 7,286,373 | B1 | * | 10/2007 | Liu | ..................... H02M 1/4241 363/16 |
| 8,242,754 | B2 | | 8/2012 | Yang | |
| 8,274,799 | B2 | | 9/2012 | Reinberger et al. | |
| 8,406,018 | B2 | * | 3/2013 | Liang | ..................... H02M 1/32 363/21.02 |
| 2007/0152795 | A1 | | 7/2007 | Zeng et al. | |

(Continued)

OTHER PUBLICATIONS

PCT Search Report and Written Opinion, PCT/US2014/039566, 9 Pages, dated Sep. 24, 2014.
"25 Watt DC/DC converter using integrated Planar Magnetics", Philips Components, Mar. 1996, 15 pgs.

(Continued)

*Primary Examiner* — Emily P Pham
(74) *Attorney, Agent, or Firm* — Moser Taboada

(57) ABSTRACT

An apparatus, method, and system for measuring current within a converter. The converter including a resonant tank circuit with a capacitor, the resonant tank circuit is coupled to a DC input bridge and a first terminal of the capacitor is coupled to a ground of the DC input bridge. In addition, a voltage monitor coupled across the capacitor for measuring a voltage across the capacitor. The converter also includes a resonant current calculation module for computing a tank current value based on the voltage.

20 Claims, 4 Drawing Sheets

(56) References Cited

U.S. PATENT DOCUMENTS

| | | | |
|---|---|---|---|
| 2008/0259649 A1* | 10/2008 | Marchand | H02M 3/33592 |
| | | | 363/21.03 |
| 2011/0149607 A1* | 6/2011 | Jungreis | H02M 3/3376 |
| | | | 363/21.02 |
| 2011/0176335 A1* | 7/2011 | Li | H02M 3/3376 |
| | | | 363/21.02 |
| 2013/0099590 A1* | 4/2013 | Ma | H02M 3/3388 |
| | | | 307/104 |
| 2013/0099787 A1* | 4/2013 | Lu | H02M 3/3376 |
| | | | 324/319 |
| 2013/0099788 A1* | 4/2013 | Xu | H02M 3/3376 |
| | | | 324/322 |
| 2014/0254203 A1* | 9/2014 | Dai | H02M 3/3353 |
| | | | 363/17 |
| 2014/0286056 A1* | 9/2014 | Yoon | H02M 3/33569 |
| | | | 363/21.03 |

OTHER PUBLICATIONS

"Planar Transformer Prototyping Kit", Coilcraft, Inc., Designer's Kit C356, 16 pgs.
K. Matsuura et al., "Power-Density Development of a 5MHz-Switching DC-DC Converter", IEEE, pp. 2326-2332.
"Design of Planar Power Transformers", Ferroxcube, 16 pgs.
L. Dixon, "Designing Planar Magnetics", Texas Instruments, 26 pgs.
E.J. Bloom, "Planar Power Magnetics", Magnetics Business & Technology, 2 pgs.
S. Xiao, "Planar Magnetics Design for Low-Voltage DC-DC Converters", Thesis submitted during Summer Term 2004, 68 pgs.

* cited by examiner

US 9,871,459 B2

METHOD AND APPARATUS FOR DERIVING CURRENT FOR CONTROL IN A RESONANT POWER CONVERTER

CROSS-REFERENCE TO RELATED APPLICATION

This application claims priority to U.S. Provisional Patent Application No. 61/828,761 filed on May 30, 2013, which is incorporated by reference herein in its entirety.

BACKGROUND OF THE INVENTION

Field of the Invention

Embodiments of the present disclosure relate generally to power conversion and, in particular, to deriving a resonant current signal for controlling controlling a resonant tank current in a resonant converter.

Description of the Related Art

Resonant converters provide many advantages over other types of power converters. Such advantages may include low noise, low component stress, low component count, and predictable conduction-dominated losses. Resonant converters may therefore be smaller, less costly, and more efficient devices that other types of converters.

The resonant converters typically comprise a bridge circuit, a resonant tank circuit, a transformer, and a current transformer (CT). The converter arrangement typically uses the CT to monitor a resonant tank current. The CT is able to generate a high quality signal that accurately represents the tank current flowing through the resonant tank circuit based on the high bandwidth afforded by the CT. While the CT provides galvanic isolation and reduces noise in the measured signal, the CT undesirably raises the cost of parts and space requirements.

Alternatively, the tank current may also be measured based on a simple resistive current shunt resistor. But, the voltage generated across any resistor for current sensing would need to be kept low to minimize unnecessary resistive losses. Hence, any current shunt signal is likely to be in the millivolt range which is troublesome as the resistive shunt will be subjected to common mode noise and high input voltage being fed into the converter. Using a resistive shunt to monitor the resonant tank current is challenging as any monitoring circuit must measure the voltage using a low signal to noise ratio (SNR).

Thus, there is a need for a method and apparatus for easily measuring current within a resonant tank of a resonant power converter at low cost.

SUMMARY OF THE INVENTION

Method and apparatus for measuring current in a resonant converter substantially as shown and/or described in connection with at least one of the figures as set forth more completely in the claims.

Various advantages, aspects, and novel features of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise a balanced current monitoring circuit coupled across a capacitor within a resonant circuit of a resonant power converter. Embodiments may be comprised of full or half-bridge power converters.

Figure 1:
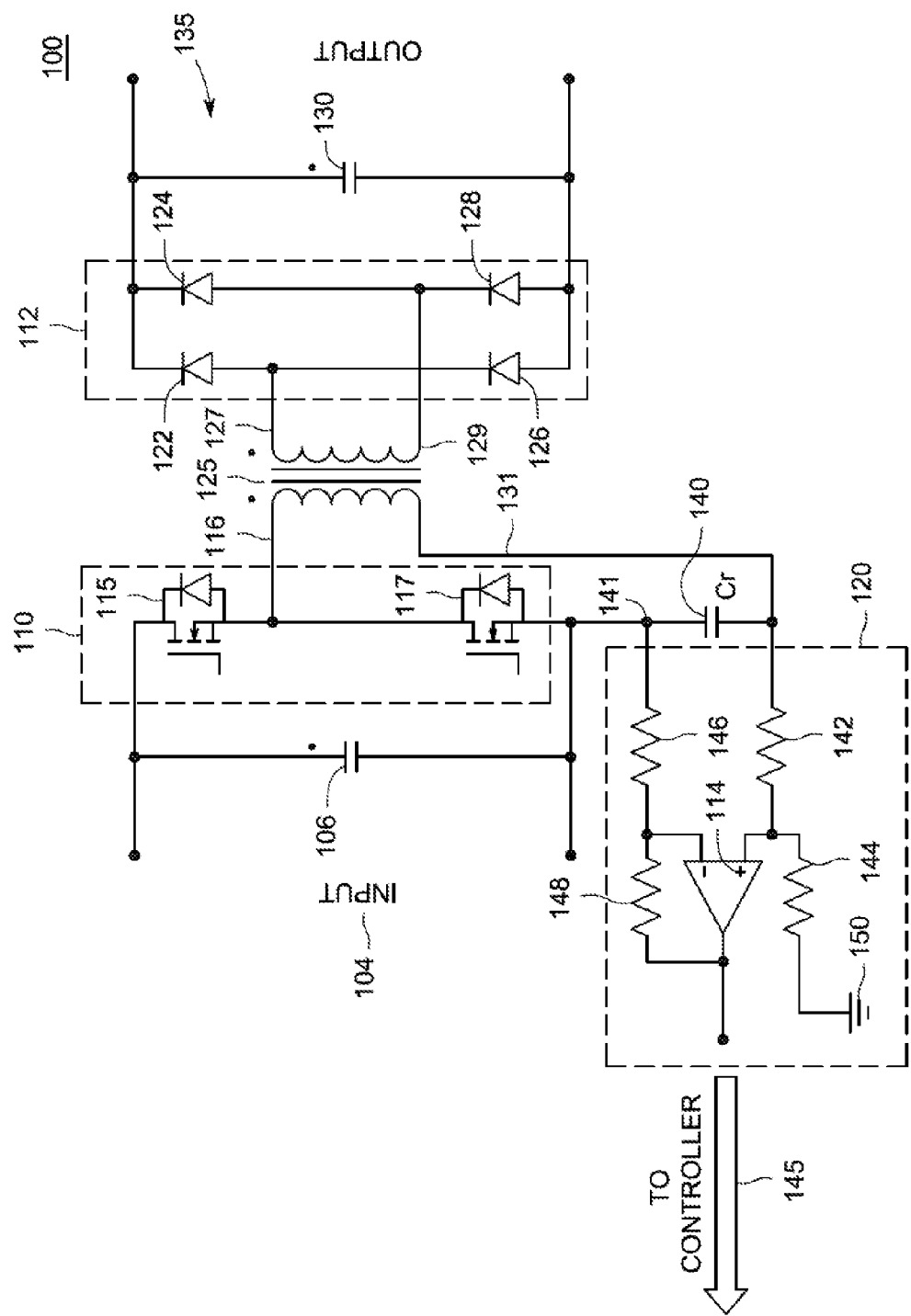
FIG. 1 is a schematic diagram of a resonant converter in accordance with one or more embodiments of the present invention.

FIG. 1 is a schematic of a resonant converter 100 in accordance with one or more embodiments of the present invention. The converter 100 is described as outputting a DC output, however other embodiments include AC output, single phase or multi-phase outputs (e.g., split-phase or three-phase). The converter 100 comprises an input port 104, an input capacitor 106, a half-bridge circuit 110, a tank capacitor 140, transformer 125, diode bridge circuit 112, output capacitor 130, output port 135, controller 145, and a voltage measuring circuit 120.

The half-bridge circuit 110 comprises switch 115 and switch 117 in series coupled across the input port 104 and input capacitor 106. A first leg 116 of a primary winding of the transformer 125 is coupled between the source and drain of the switches 115 and 117, respectively. The switches 115 and 117 may be transistors or other forms of electronic switches described below. In some embodiments, the half-bridge circuit 110 may be a full bridge circuit comprising four transistors. The tank capacitor 140 is coupled between in the source of switch 117 and a second leg 131 of the primary winding of transformer 125. The half-bridge circuit is comprised of electronic switches depicted as transistors (e.g., n-type metal-oxide-semiconductor field-effect transistors (MOSFETs), insulated gate bipolar transistors (IGBTs), bipolar junction transistors (BJTs), p-type MOSFETs, gate turnoff thyristors (GTOs), and the like).

The diode bridge circuit 112 comprises serially coupled diodes 122 and 124, coupled in parallel with diodes 126, and 128. The diode bridge circuit 112 is coupled between the secondary winding of the transformer 125 and the output capacitor 130. A leg 127 of the secondary winding of the transformer 125 is coupled between the cathode of diode 126 and anode of diode 122. A leg 129 of the secondary winding of the transformer 125 is coupled between the cathode of diode 128 and anode of diode 124. In alternative embodiments, the diode bridge circuit 112 may comprise transistors in place of the diodes 122, 124, 126, and 128.

In some embodiments, the voltage measuring circuit 120 comprises an operational amplifier 114, and resistors (142, 144, 146, 148). A first terminal of the tank capacitor 140 is coupled to a first terminal of the resistor 146 and the drain of switch 117. A second terminal of the tank capacitor 140 is coupled to a second leg 131 of the primary winding of the transformer 125 and to a first terminal of resistor 142. The output of the amplifier 114 is coupled to a controller 145 for measuring the voltage. The controller 145 is also coupled to the gates of the switches 115 and 117. In alternative embodiments, the additional voltage sensing configurations (e.g., voltmeters, controllers, and the like) may measure the voltage across the tank capacitor 140.

In some embodiments, the voltage generated across the tank capacitor 140 is measured by monitoring the voltage on the other node 141 of the tank capacitor 140 with respect to the ground 150 of the capacitor 140. The measured voltage amplified by the amplifier 114 and output to the controller 145.

In some embodiments, the input port 104 may be coupled to a DC source such as a PV module and the output port 135 may be to a load such as a DC load or via a second DC/AC converter to an AC grid. In operation, a DC power source such as a photovoltaic (PV) module (not shown) is coupled across the input port 104. DC power is then converted to substantially square wave using the half-bridge circuit 110 (as controlled by controller 145), the transformer 125, and the diode bridge circuit 112. The tank capacitor 140 and the leakage inductance form the primary winding of the transformer 125 form a resonant tank circuit such that the converter 100 is operated in a resonant manner based on the resonant frequency of that tank. To determine whether the switches of the half-bridge circuit 110 are outputting at a desired current, the voltage measuring circuit 120 measures a tank voltage across the tank capacitor 140 with respect to ground 150 and the voltage signal is coupled from the amplifier 114 to the controller 145.

In some embodiments, the voltage measuring circuit is operated as an op-amp differential amplifier. In such an embodiment, the input resistance between resistors 142 and 146 will be substantially the same, and likewise, the feedback resistances of resistors 144 and 148 will be substantially the same for a balanced configuration. The output of the amplifier 140 given by Equation 1:

$$Vout = Vcap \times (R_{feedback}/R_{input}) \quad (1)$$

In Equation 1, the output voltage (Vout) of the amplifier 114 is equal to the voltage (Vcap) across the resonant tank capacitor 140 multiplied by the resistance ratio of the resistances. Rfeedback is the resistance value of either resistor 144 or 148. Rinput is equal to either the resistance value of either resistor 142 or 146.

The current flowing through a capacitor can be derived by measuring the rate of change of voltage generated across the capacitor:

$$i = C(dv/dt) \quad (2)$$

Following Equation 2, the resonant tank capacitor 140 may function as also as a resonant tank current sensor. The controller 145 calculates a model current value based on the voltage, predetermined capacitor size, voltage change, and/or charging time. The controller 145 determines the control of the half-bridge 110 based on the measured voltage and calculated current. The switching frequency of switches 115 and 117 is then adjusted by the controller 145.

The topology of converter 100 enables the voltage across the tank capacitor 140 to be measured without any common mode noise effect. Thus, the capacitor 140 is coupled to ground 150 to reduce or eliminate the common mode noise. By locating the resonant tank capacitor 140 such that one end of the capacitor is connected to the input bridge ground, the common mode noise is eliminated. The voltage measuring circuit 120 is balanced and eliminates common mode noise by rejecting signals common to the input of the amplifier 114 such that the amplifier 114 operates as a common mode rejection amplifier.

Figure 2:
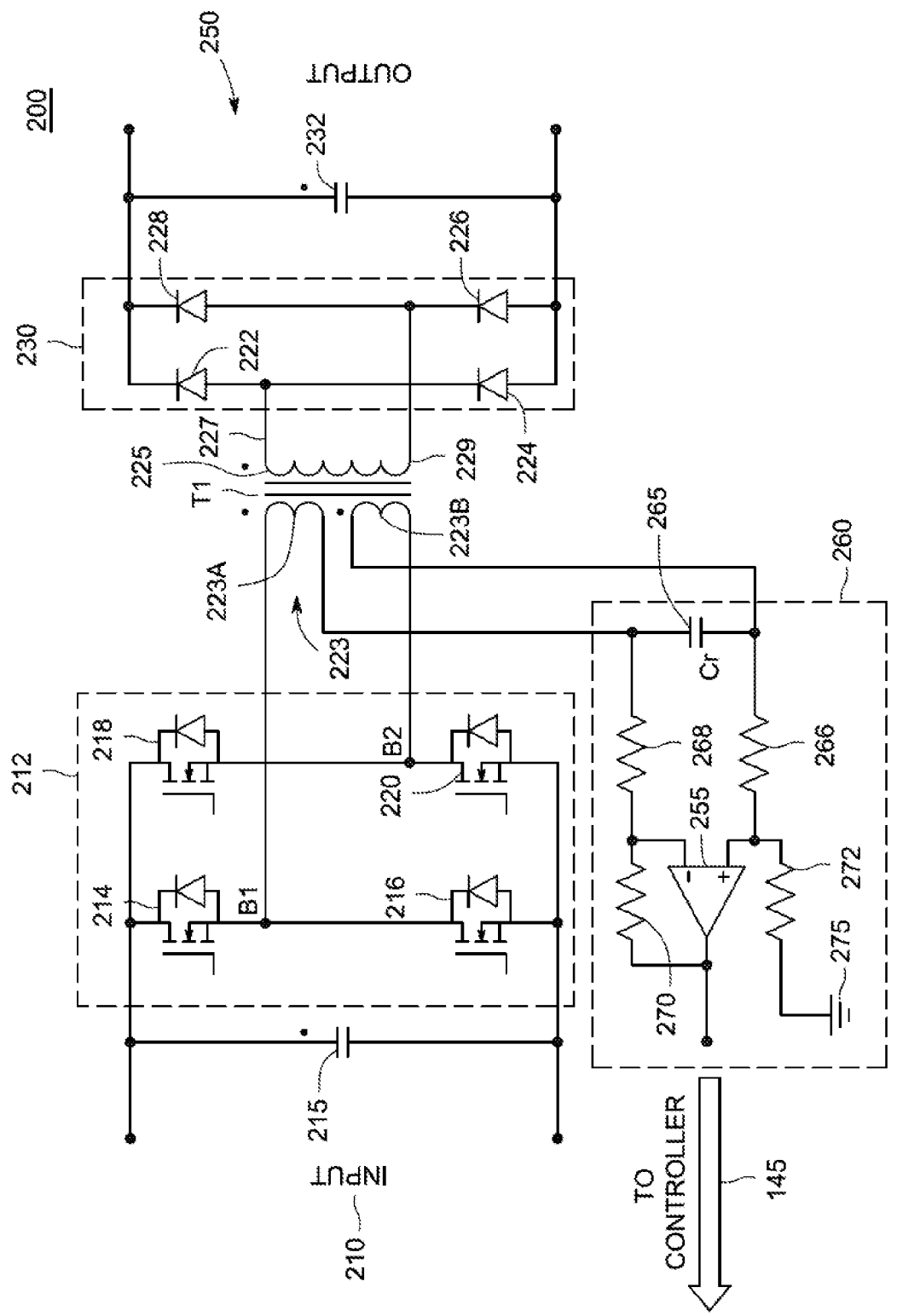
FIG. 2 is a schematic of a resonant converter with a split primary coil in accordance with one or more embodiments of the present invention.

FIG. 2 is a schematic of a resonant converter 200 with a split primary winding 223 in accordance with one or more embodiments of the present invention. The converter 200 is described as outputting a DC voltage, however other embodiments include AC single phase and multi-phase outputs (e.g., split-phase or three-phase). The converter 200 comprising transistors that may be analogously controlled by the controller 145 described in FIG. 1.

The converter 200 comprises an input capacitor 215 coupled across an input port 210, a full bridge circuit 212, a tank capacitor 265, a transformer T1, a diode bridge circuit 230, an output capacitor 232 coupled across output port 250, a voltage measurement circuit 260, and a controller 145. Alternative embodiments may include a half-bridge circuit in place of the full bridge circuit 212. The converter 200 is comprised of switches depicted as transistors (e.g., n-type metal-oxide-semiconductor field-effect transistors, or MOSFETs).

The full bridge circuit 212 comprises switches 214, 216, 218, and 220 coupled in an H-bridge configuration. The full bridge circuit 212 is coupled between the input capacitor 215 and a primary winding 223 of transformer T1. A first leg of the first sub-winding 223A is coupled at node b1 between the source and drain of switches 214 and 216, respectively. A second leg of the first sub-winding 223A is coupled to a first terminal of tank capacitor 264. A first leg of the second sub-winding 223B is coupled at node b2 between the source and drain of switches 218 and 220, respectively. A second leg of the second sub-winding 223B is coupled to a second terminal of the tank capacitor 265. As will be discussed further below, the tank capacitor 265 is coupled across the primary winding 223 including two sub-windings 223A and 223B to facilitate voltage measurements and eliminate noise.

The diode bridge circuit 230 comprises serially connected diodes 222 and 224, coupled in parallel to diodes 226, and 228 coupled between the secondary winding 225 of the transformer T1 and the output capacitor 232. A leg 227 of the secondary winding of the transformer T1 is coupled between the cathode of diode 224 and anode of diode 222. A leg 229 of the secondary winding of the transformer 225 is coupled between the cathode of diode 226 and anode of diode 228. The diode bridge circuit 230 operates as an AC switching circuit outputs substantially sinusoidal AC current smoothed by the output capacitor 232 for the output port 250. In alternative embodiments, the diode bridge circuit 230 may comprise transistors in place of the diodes 222, 224, 226, and 228.

In some embodiments, the voltage measuring circuit 260 comprises operational amplifier 255, and resistors (266, 268, 270, 272). A first terminal of the tank capacitor 265 is coupled to the resistor 268 and a second leg of the first sub-winding 223A. A second terminal of the tank capacitor 265 is coupled to the resistor 266 and a first leg of the second split winding 223B of the transformer T1. The output of the amplifier 255 is coupled to a controller 145 for measuring the voltage. The output of amplifier 255 is similarly calculated using the method found in Equation 1. The controller 145 is also coupled to the gates of the switches 214, 216, 218, and 220. The amplifier 255 amplifies the voltage measurement across the capacitor 265 and outputs the measurement to the controller 145. The voltage is used to determine the current in the tank circuit (e.g., current in the primary winding, comprised of the first and second sub-windings 223A and 223B). The controller 145 determines the switching full-bridge circuit 212 based on the measured voltage and calculated current.

Current may also be calculated using the Equation 2 similarly discussed above by tracking changes in voltage across the tank capacitor 265. Alternative embodiments may apply a lookup table containing resonant current values for predetermined voltage values. Hence using Equation 2, the resonant tank capacitor 265 may function as also as a resonant tank current sensor. The capacitor 265 is coupled to ground 150 to reduce or eliminate the common mode noise.

As previously described, the primary winding 223 of the power transformer T1 is split into a separate first sub-winding 223A and a second sub-winding 223B. The secondary winding 225 remains whole and is coupled across the diode bridge circuit 230. The split eliminates common mode noise generated by the full bridge circuit 212 from manifesting on the resonant capacitor 265. The resonant tank capacitor 265 is coupled to two bridge nodes (e.g., b1 and b2) by splitting the primary winding into two sub-windings (223A, 223B). The first bridge node b1 is located between two serially connected transistors (214, 216) comprising a first half-bridge of the full bridge circuit 212. Similarly, the second bridge node b2 is located between the remaining switches (218, 220) of the full bridge circuit 212. One terminal of the capacitor 265 is coupled to the sub-winding 223A while the other terminal of the capacitor 265 is coupled to sub-winding 223B.

Further embodiments may also split the secondary winding similar to that of sub-windings 223A and 223B. However, for purposes of this explanation it is assumed to be a single winding.

The first and second sub-windings (223A, 223B) should be made equal in size and location (e.g., in turns, geometry, capacitance to the core, capacitance to secondary winding, proximity to the transformer core and the like). The position of the sub-windings 223A and 223B are such that the resonant tank capacitor 265 is located in the exact electrical center potential of what cumulatively amounts to the primary winding of power transformer T1, thus, making the physical layout completely symmetrical with respect to the resonant tank capacitor 265. The symmetry eliminates any common mode noise and simplifies measuring/monitoring the voltage generated across the resonant tank capacitor 265. The sub-windings (223A, 223B) are ultimately coupled to amplifier 255, that together operate as a common mode rejection amplifier that cancels the common mode noise.

Figure 3:
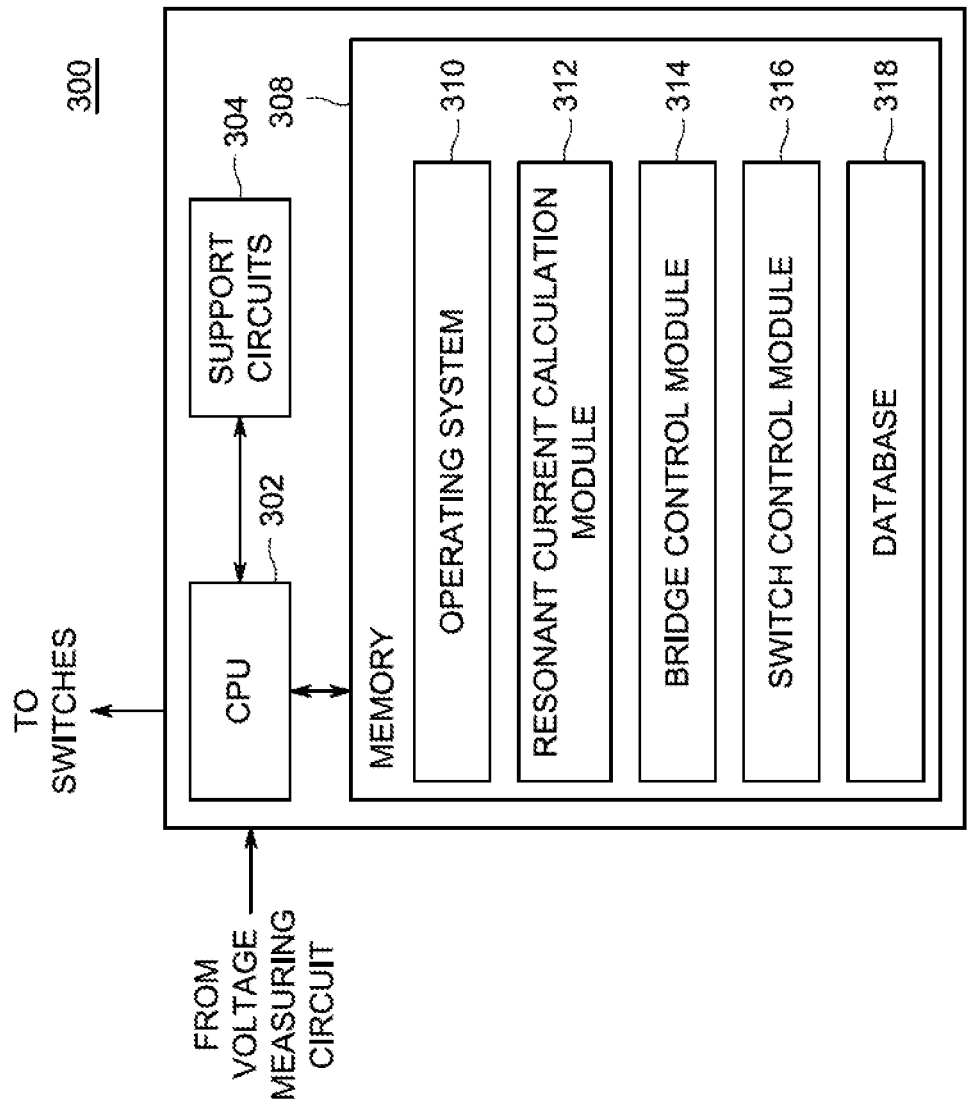
FIG. 3 is a block diagram of an exemplary controller in accordance with one or more embodiments of the present invention.

FIG. 3 is a block diagram of an exemplary controller 145 in accordance with one or more embodiments of the present invention. The controller 145 may be comprised of hardware, software, or a combination thereof and of the resonant converter 100 (e.g., as depicted in FIGS. 1 and 2). The controller 145 comprises a CPU 302, coupled to each of support circuits 304 and memory 308 containing instructions and algorithms. The CPU 302 processes inputs and outputs to the transistors/switches. In some embodiments, the CPU 302 may process external communications (i.e., via a gateway) and control a grid interface. Alternative embodiments may use a microcontroller or algorithms on a custom Application Specific Integrated Circuit (ASIC) in place of or in addition to the CPU 302.

Examples for single and three phase conversion are herein incorporated by reference in their entirety and may be found in commonly assigned issued patent application U.S. Patent App. 2012/0170341 entitled "Method and Apparatus for Resonant Power Conversion" filed Jan. 3, 2012.

The memory 308 may comprise random access memory, read-only memory, removable disk memory, flash memory, and various combinations thereof. The memory 308 is sometimes referred to a main memory and may in part, be used as cache memory or buffer memory. The memory 308 stores instructions comprising an operating system 310 (if necessary), resonant current calculation module 312, bridge control module 314, switch control module 316, and a database 318 (if necessary). The operating system 310 coordinates communication among the modules and the CPU 302 that executes the instructions stored in memory 308. The database 318 may store information about the converter 100 including the storage capacity of the tank capacitor 265.

The resonant current calculation module 312 stores instructions for calculating a resonant current based on the change in voltage from the voltage measuring circuit (e.g., circuit 260). The resonant current calculation module 312 may include an analog to digital converter (ADC) for converting voltage measurements received from the voltage measuring circuit 260. In some embodiments, the current is calculated using Equation 1 discussed above. The calculated tank current is provided to the switch control module 316 as a control input to the bridge control module 314 for use in controlling the input bridge (e.g., full bridge circuit 212) to achieve the desired converter output. Based on the calculated resonant current, the resonant current calculation module 312 sends commands to adjust the switching frequency of the bridge circuit (e.g., full bridge circuit 212) via the bridge control module 314 and switch control module 316. The switch control module 316 controls the gates of switches 214, 216, 218, and 220 in the full bridge circuit 212 through pulse width modulation (PWM) for converting DC power. In some embodiments, the switch control module 316 controls switches in the diode bridge circuit 230.

In some embodiments, the desired output may be to meet a particular threshold for optimal efficiency. For example, if a PV module is coupled to the input port (e.g., input port 210) the threshold may be based on equations or predetermined numbers for maximum power point tracking (MPPT). In other embodiments, the resonant current calculation module 312 may take into account the storage size of the capacitor and monitor the length of charging and discharging periods.

Figure 4:
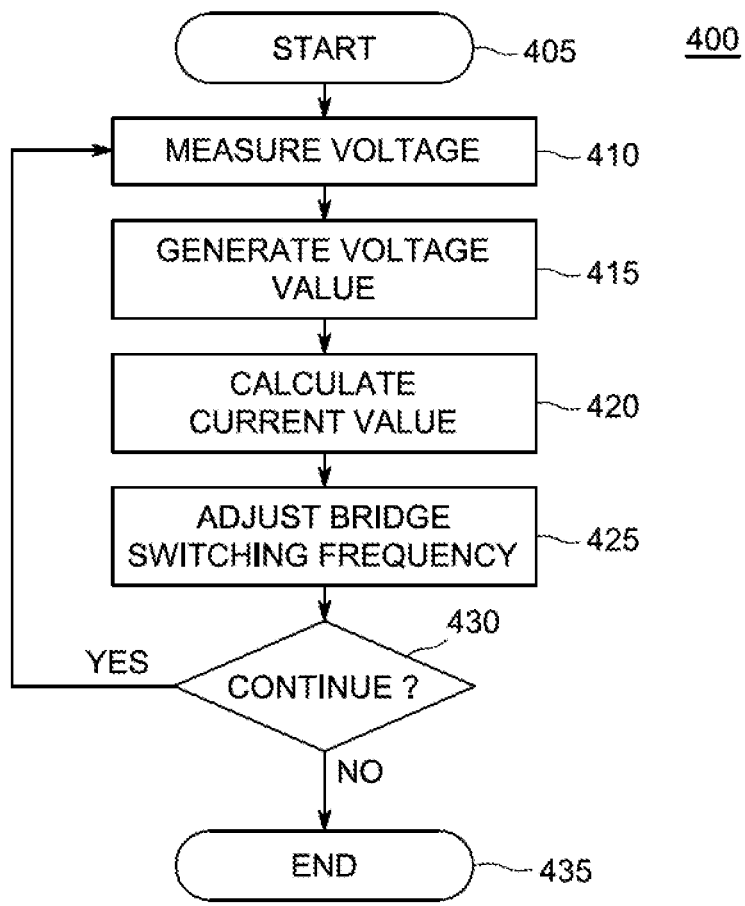
FIG. 4 is a flow diagram of an exemplary method for measuring current in accordance with one or more embodiments of the present invention.

FIG. 4 is a flow diagram of an exemplary method 400 for measuring current in accordance with one or more embodiments of the present invention. The method 400 is executed at least in part using instructions stored in the controller 145 and by embodiments described in the resonant converter 100. In some embodiments, the method 400 is performed for determining the resonant tank current value in a resonant converter having the topology depicted in FIG. 1; in other embodiments, the method 400 is performed for determine the resonant tank current value in a resonant converter with the split winding configuration as described in FIG. 2.

The method 400 begins at step 405 and continues to step 410. At step 410, the method 400 the voltage is measured across the tank capacitor (e.g., capacitor 265). Alternatively, the method measures the rate of change of the voltage on the tank capacitor 265. The location of the tank capacitor in the resonant converter (i.e., as depicted in FIGS. 1 and 2) allows the voltage across the capacitor to be measured without a common mode noise effects as previously described.

Next, at step 415, the voltage measurement is generated into a voltage value using an analog to digital converter (ADC) within the controller 145 and the like. Alternatively, the ADC may be located separate from the controller 145 (e.g., within the voltage measuring circuit 260).

Next at step 420, a tank current value is calculated. In some embodiments, the value is calculated by the controller 145. By measuring the rate of change of voltage at step 410, generated across the capacitor current is derived by Equation 1. The resonant tank capacitor 265 may thus function as also as a resonant tank current sensor. In some embodiments, the tank capacitor 265 is located between the split sub-windings of transformer T1 to isolate the tank capacitor 265 from common mode noise and high DC voltage from the DC source (e.g., a PV module).

At step 425, the bridge switching frequency is adjusted by the bridge control module 314 in controller 145 based on the tank current value as a control input. The method 400 then determines after adjustment whether to continue at step 430. If the method 400 is to continue, the method 400 returns to step 410. If however, the method 400 is not to continue, the method ends at step 435.

Figure 5:
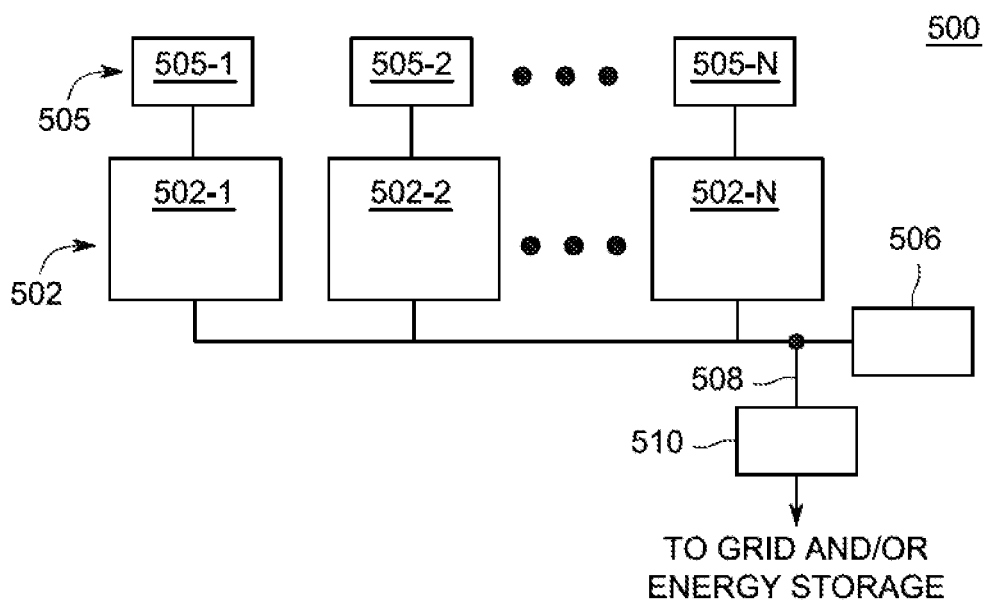
FIG. 5 is a block diagram of a system for power conversion in accordance with one or more embodiments of the present invention.

FIG. 5 is a block diagram of a system 500 for power conversion in accordance with one or more embodiments of the present invention. This diagram only portrays one variation of the myriad of possible system configurations and devices that may utilize the present invention. The present invention can be utilized in any system or device that uses a resonant converter for DC-DC, DC-AC, or AC-DC power conversion.

The system 500 comprises a plurality of power converters 502-1, 502-2 . . . 502-N, collectively referred to as power converters; a plurality of DC power sources 505-1, 505-2 . . . 505-N, collectively referred to as DC power sources 505; a system controller 506; a bus 508; and a load center 510. The DC power sources 505 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 502-1, 502-2 . . . 502-N is coupled to a single DC power source 505-1, 505-2 . . . 505-N, respectively; in some alternative embodiments, multiple DC power sources 505 may be coupled to a single power converter 502, for example a single centralized power converter 502. Each of the converters 502 comprises a converter 100 that determines a resonant tank current for use in operating the converter 100 as previously described. Each power converter 502 further comprises additional circuitry for converting DC output from the converter 100 to an AC output. In some embodiments, the power converters 502 may generate a single phase AC power output; in other embodiments, the power converters 502 may generate a split-phase or three-phase AC output.

The power converters 502 are coupled to the system controller 506 via the bus 508. The system controller 506 is capable of communicating with the power converters 502 by wireless and/or wired communication (e.g., power line communications) for providing operative control of the power converters 502. The power converters 502 are further coupled to the load center 510 via the bus 508.

The power converters 502 are each capable of converting the received DC power to AC power, although in other embodiments the power converters 502 may convert the DC input power to a DC output power or, alternatively, receive an AC input and convert the received input to a DC output. The power converters 502 couple the generated output power to the load center 510 via the bus 508. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 502 convert the DC input power to AC power that is commercial power grid compliant and couple the AC power to the commercial power grid via the load center 510.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. An apparatus for measuring current in a power converter comprising:
    a resonant tank circuit with a capacitor, the resonant tank circuit is coupled to a DC input bridge and a first terminal of the capacitor is coupled to a ground of the DC input bridge;
    a voltage monitor coupled across the capacitor for measuring a voltage across the capacitor; and
    a resonant current calculation module for computing a tank current value, based on the voltage across the capacitor, of a tank current through the capacitor.

2. The apparatus of claim 1, wherein the DC input bridge is a half-bridge.

3. The apparatus of claim 1, wherein the DC input bridge is a full-bridge and coupled to a transformer with a primary winding split into sub-windings.

4. The apparatus of claim 3, wherein the capacitor is located in an electrical center potential of the primary winding.

5. The apparatus of claim 3, wherein the sub-windings further comprise a first and a second sub-winding equal in space, size, and number of turns.

6. The apparatus of claim 5, wherein the transformer further comprises a secondary winding as a single winding with no sub-windings.

7. The apparatus of claim 1, wherein the capacitor is coupled across an amplifier and a primary winding of a transformer.

8. The apparatus of claim 1, wherein a bridge control module coupled to the resonant current calculation module operative to control switches in the DC input bridge.

9. The apparatus of claim 1, wherein a second terminal of the capacitor is coupled to the DC input bridge through a primary winding of a transformer.

10. A system for measuring current in a power converter comprising:
    at least one photovoltaic (PV) module; and
    at least one power converter coupled to the PV module comprising:
        a resonant tank circuit with a capacitor, the resonant tank circuit is coupled to a DC input bridge and a first terminal of the capacitor is coupled to a ground of the DC input bridge;

a voltage monitor coupled across the capacitor for measuring a voltage across the capacitor; and a resonant current calculation module for computing a tank current value, based on the voltage across the capacitor, of a tank current through the capacitor.

11. The system of claim 10, wherein the DC input bridge is a half-bridge.

12. The system of claim 10, wherein the DC input bridge is a full-bridge and coupled to a transformer with a primary winding split into sub-windings.

13. The system of claim 12, wherein the capacitor is located in an electrical center potential of the primary winding.

14. The system of claim 12, wherein the sub-windings further comprise a first and a second sub-winding equal in space, size, and number of turns.

15. The system of claim 14, wherein the transformer further comprises a secondary winding as a single winding with no sub-windings.

16. The system of claim 10, wherein the capacitor is coupled across an amplifier and a primary winding of a transformer.

17. The system of claim 10, wherein a bridge control module coupled to the resonant current calculation module operative to control switches in the DC input bridge.

18. The system of claim 10, wherein a second terminal of the capacitor is coupled to the DC input bridge through a primary winding of a transformer.

19. A method for measuring current in a power converter comprising:

measuring a voltage across a capacitor of a resonant tank in a resonant power converter, wherein the resonant tank is coupled to a DC input bridge of the resonant power converter and wherein a terminal of the capacitor is coupled to a ground of the DC input bridge, wherein the voltage is measured by a voltage monitor coupled across the capacitor;

measuring by a resonant current calculation module, a change in the voltage over time; and determining by the resonant current calculation module, a tank current value, based on the change in the voltage across the capacitor, of a tank current through the capacitor.

20. The method of claim 19, further comprising adjusting a switching frequency of switches within the DC input bridge coupled to the capacitor and a transformer with a primary winding split into a first sub-winding and second sub-winding.

* * * * *